United States Patent [19]

Cartella

[11] Patent Number: 4,655,717
[45] Date of Patent: Apr. 7, 1987

[54] VEHICULAR SPORTS DEVICE ABLE TO TRAVEL OVER FIRM SURFACES, SOFT SURFACES OR LIQUID SURFACES

[75] Inventor: Pietro Cartella, Sciolze, Italy

[73] Assignee: Tecnoteam S.N.C. di Tardito Dario e Cartella Pietro, Turin, Italy

[21] Appl. No.: 561,748

[22] Filed: Dec. 15, 1983

[30] Foreign Application Priority Data

Dec. 27, 1982 [IT] Italy ............................... 54134/82[U]

[51] Int. Cl.$^4$ ............................................. B63H 16/20
[52] U.S. Cl. ..................................... 440/27; 280/221; 440/100
[58] Field of Search ................. 114/270, 283; 440/100, 440/26, 27, 29, 30; 416/84; 280/282, 287, 278, 7.1, 221

[56] References Cited

U.S. PATENT DOCUMENTS

| 264,073 | 9/1882 | Gallup | 280/282 |
|---|---|---|---|
| 1,104,229 | 7/1914 | Szegel | 440/100 |
| 1,423,994 | 7/1922 | Bunde | 280/221 |
| 1,617,357 | 2/1927 | Walter | 280/221 |
| 2,297,496 | 9/1942 | Pomilio | 441/76 |
| 3,043,389 | 7/1962 | Steinberg | 280/287 |
| 3,249,084 | 5/1966 | Plants | 114/283 |
| 3,310,020 | 3/1967 | Slemmons | 440/100 |
| 3,659,871 | 5/1972 | Hott | 280/221 |
| 4,016,826 | 4/1977 | Sanders | 440/27 |

FOREIGN PATENT DOCUMENTS

| 1261381 | 12/1961 | France | 280/221 |
|---|---|---|---|
| 698184 | 11/1965 | Italy | 440/26 |

*Primary Examiner*—Galen Barefoot
*Assistant Examiner*—Thomas J. Brahan
*Attorney, Agent, or Firm*—Young & Thompson

[57] ABSTRACT

A seatless pedal operated vehicular sports device capable of moving our firm surfaces, soft surfaces or liquid surfaces, comprises a seatless frame, a fork having downwardly extending prongs secured for pivotal movement on a forward portion of the frame, the fork having handlebars at its upper end and a front wheel in the form of a hollow cylinder rotatable between its tines. The frame at its lower rear end rotatably carries a cranked pedal assembly disposed between and secured rigidly to two rear wheels in the form of hollow cylinders. The parts are so arranged that the user's weight is borne jointly by the pedal assembly and the handlebars.

4 Claims, 7 Drawing Figures

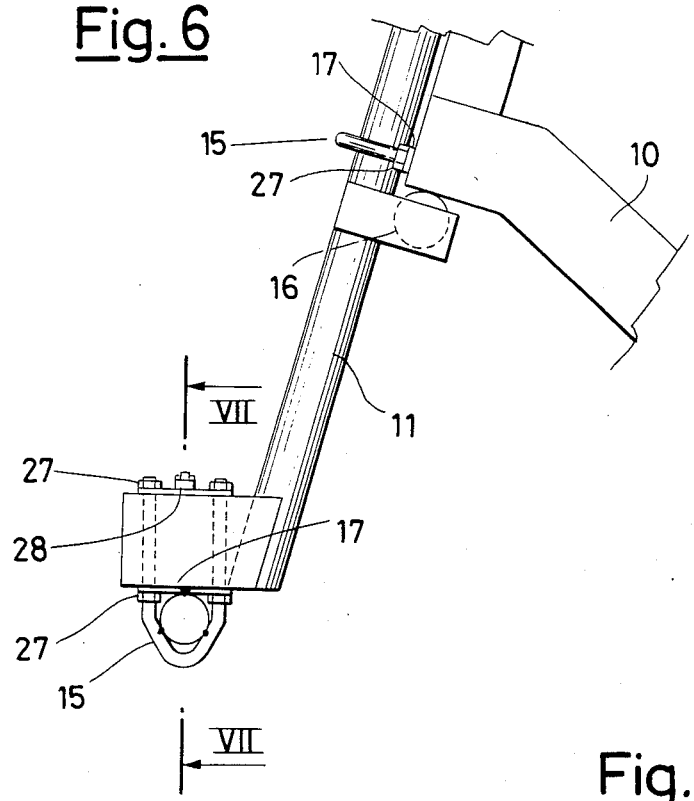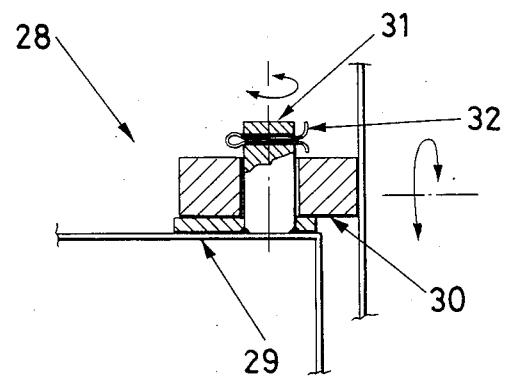

VEHICULAR SPORTS DEVICE ABLE TO TRAVEL OVER FIRM SURFACES, SOFT SURFACES OR LIQUID SURFACES

This invention relates to a vehicular sports device whose main purpose is to enable progress to be made over courses marked out on firm surfaces (solid, asphalt, fields, tracks, etc.), surfaces soft (mud, snow, grass, etc.) or liquid surfaces (water, etc.).

Motorised vehicles permitting forward movement over snow-covered and sandy surfaces or along the shore are known. These, however, are expensive because they are equipped with an engine. In addition, they do not demand any stimulating commitment on the part of the user when they are driven. The said user, in fact, is placed at the wheel of a vehicle which despite its different shape and dimensions can be compared to a conventional motorcycle.

The object of the present invention, on the other hand, is to provide an engineless means requiring a stimulating commitment on the part of the person driving it through unfamiliar movements on surfaces of any kind, whether firm, soft, or liquid. In addition to being a means of transport, the vehicular device proposed is thus a piece of sports equipment enabling the user to enjoy himself at the same time as performing physical exercises.

The invention, in fact, is not fitted with braking means. Braking is thus solely obtained by the user through shifting his weight in different directions dependent on the type of surface over which it is being driven.

Furthermore, the vehicular sports device according to the invention requires the driver to adopt a standing position so that the weight of his body is distributed over his legs and arms. This feature distinguishes the said device from all other similar devices on the market and enhances its stimulation of the driver's engagement in the sport and his ability.

To achieve these and other objects to be explained more clearly hereunder, the invention provides a vehicular sports device capable of moving over firm surfaces, soft surfaces or liquid surfaces comprising a hingedly interconnected frame and fork, the said fork bearing at its upper end an integral handlebar and rotatably at the other end of its fork a wheel consisting of a hollow cylinder, the said frame also extending from the said point of hinging in the form of a fork the ends of whose prongs are each hinged to a half-shaft to which is splined a wheel formed of a hollow cylindrical body and paddles integral with the said wheel, the two half-shafts being rigidly connected to each other through a crankshaft forming the pedal assembly.

A preferred embodiment of the vehicular device according to the invention will now be described by way of example only with reference to the accompanying drawings in which:

FIG. 6 is an enlarged view of a detail of the device;

FIG. 7 is a section taken on the line VII—VII in FIG. 6.

Figure 1:
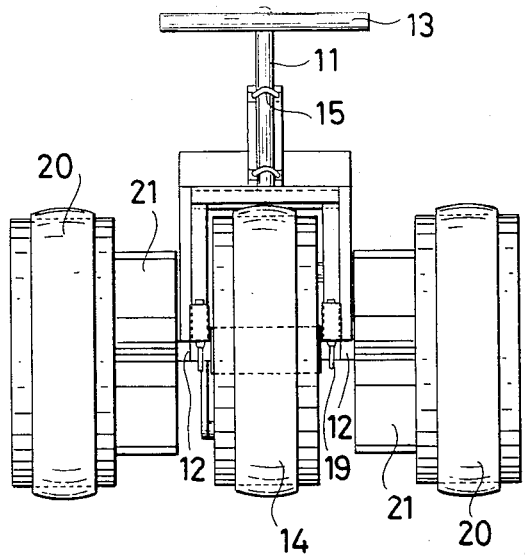
FIGS. 1, 2, 3 and 4 are a front view, side view, rear view and plan view respectively of the device according to the invention.
Figure 2:
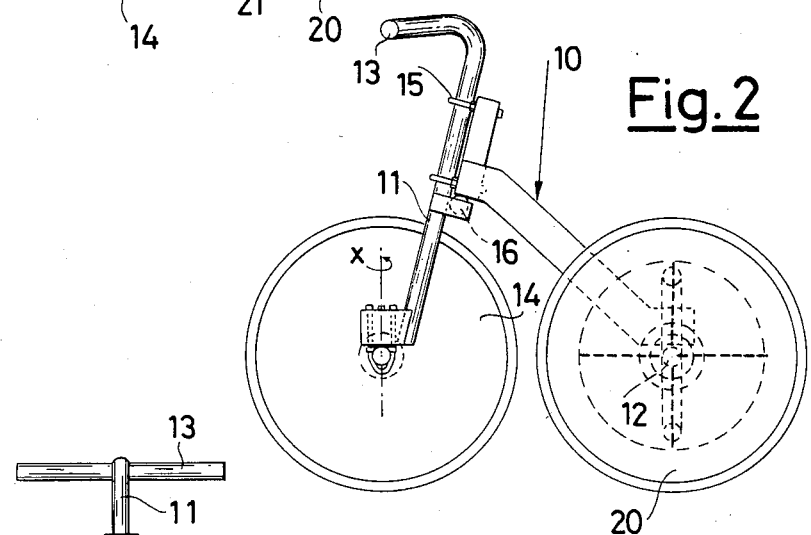
Figure 3:
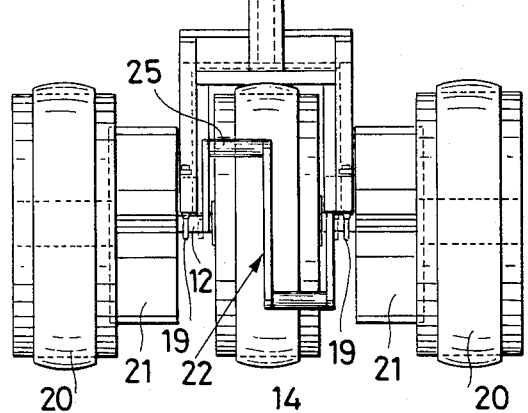
Figure 4:
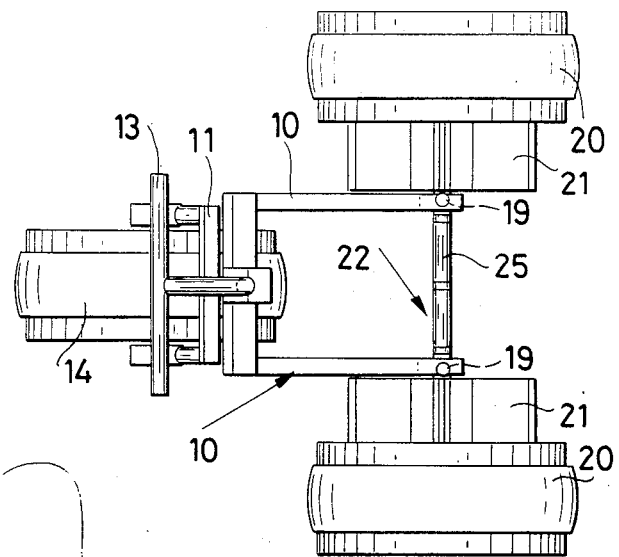

The vehicular device according to the invention is substantially composed of:

A metal frame 10 in the form of a fork which supports an assembly composed of a metal front fork 11 and a metal rear axle 12. The front fork 11 turns around a vertical axis x and is supplied with handlebars 13 at its upper end, whereas the front wheel 14 is attached to its lower end (as will be described). The fork 11 is held to the frame 10 by means of restraints 15 and rests on the said frame 10 through the intervention of a rubber shock-absorber 16 (FIG. 6) installed under the lower restraint 15. Replaceable anti-friction plates 17 (FIG. 6) interposed between the rotating part or tube of the fork 11 and the frame 10.

The metal rear axle 12 is attached to the frame 10 by means of restraints 19. Two wheels 20 are splined to its outer part, whereas to the inside of and integral with the two wheels 20 there are two paddles 21 that serve to move the said item of equipment in water. The central portion of the rear axle 12 between the paddles 21 extends crank-wise to form the rigid portion of the pedals 22. The movable part of the pedals 22 consists of a platform 23 with an appropriate notch 24 (FIG. 5) hinged to the rigid crossbar 25 of the pedal 22 and attached to the user's foot by means of a strap 26 or a shoe with a suitably shaped sole (not shown).

The steel front 15 and rear 19 restraints serve to bind the fork 11 and the rear axle 12 respectively to the frame 10 and each constitute two points of contact between the rotating parts, whereas the third point of contact between the said parts is provided by the anti-friction plates 17. The areas in which the restraints 15 and 19 are attached to the frame 10 are threaded so that they can be locked by means of threaded nuts 27 (FIG. 6), with the interposition of the said anti-friction plates 17 where required. Take-up devices 28 (FIGS. 6 and 7) are provided to eliminate the axial play of the wheels. The said devices consist of a metal plate 29 (FIG. 7) to which is attached a washer 30 turning on a pin 31 and held by a split pin 32.

These take-up devices 28 are attached to the frame 10 or the front fork 11, and are referenced to the inner walls of the rear wheels 20 and the outer walls of the front wheel 14. As already stated, attachment is by means of the restraints 15 and 19 and threaded nuts 27.

The operation of the vehicular device according to the invention will now be described.

When moving forwards or backwards over relatively flat firm or loose surfaces, the user having fixed the platforms 23 to his feet by means of the straps 26 stands upright on the vehicular device and brings the notches 24 of the platforms 23 into line with the cross-bar 25 of the pedals 22. At this point, the pedal assembly will be formed (without the aid of bearings) by engaging the platform 23 on the cross-bar 25 forming the axle of the pedal. At the same time, the user's hands grip the handlebars 13 at the upper end of the front fork 11. By pressing his feet on the pedals 22 the user will move the device thanks to the rotation of the wheels 14 and 20.

To change direction either forwards or backwards on the said flat firm or loose surfaces, the user will shift his body towards the front fork 11 and impose his weight on the same. At the same time, by arching his back and bending his feet forwards and downwards so as to engage the platforms 23 on the axles of the pedals, he shifts the rear axle 12 in the required direction.

On straightening the front wheel 14 by means of the fork, he can proceed in the desired direction.

To change direction forwards or backwards when moving across sloping firm or loose surfaces, the user operates the pedals 22 to move the device in a straight line towards the gentler part of the slope, giving slight touches to the steering in the direction opposite to that desired and shifting the weight of his body uphill. On straightening the front wheel, he can proceed in the direction desired.

To brake on firm or loose surfaces, the user manoeuvres the front wheel 14 through the handlebar 13 to steer it. The result of this is that the two rear wheels 20 should describe different radii because they are required to travel along curves that are not the same size.

This result is impossible, however, because the wheels 20 are rendered integral by the fixed rear axle 12.

The vehicular device thus comes to a stop on account of the anti-differential effect.

In cases where it is required to move forwards or backwards on liquid surfaces, the device will float with part of its wheels 14 and 20 under water. The said wheels provide a buoyancy of one-third each.

Part of the paddles 21 will also be under water. By pedalling forwards, therefore, the user will move the vehicular device forwards, and by pedalling backwards he will make it go backwards.

Braking during forward or rearward travel on liquid surfaces is simply obtained either by changing the pedalling direction with respect to the direction of travel or by loss of way, while changes in direction are imposed by turning the front wheel 14, which acts as a rudder since it is partly submerged.

When going uphill on loose surfaces, movement in a straight line is obtained in the same way as described above for relatively flat surfaces.

Changes in direction, on the other hand, are brought about by steering the front wheel and pressing on the pedals so as to slide the rear wheel on the inside of the curve described by the vehicular device. On straightening the front wheel, one can proceed in the direction desired.

When going downhill on surfaces with very little traction, especially snow-covered ground, the user will move the vehicular device in a straight line in the same way as already described for flat surfaces.

If, on reaching a sufficient speed, he reverses the movement of the pedals, the rear axle will start to skid. Since, as is known, when its rear axle is blocked a vehicle tends to deviate from a straight line and its rear axle tends to slew sideways, the user will give light touches to the steering and shift his body meight as required to maintain the direction desired.

To brake when going downhill on surfaces with very little traction, especially on snow-covered ground, the user will reverse the movement of the pedals causing the rear axle to slide and starting a slewing movement, assisting the process in addition by steering and shifting the weight of his body uphill. Stopping is the result of a succession of slewing movements, because the vehicular device will set itself transversely to the direction of motion and the edges of its wheels will dig in.

Figure 5:
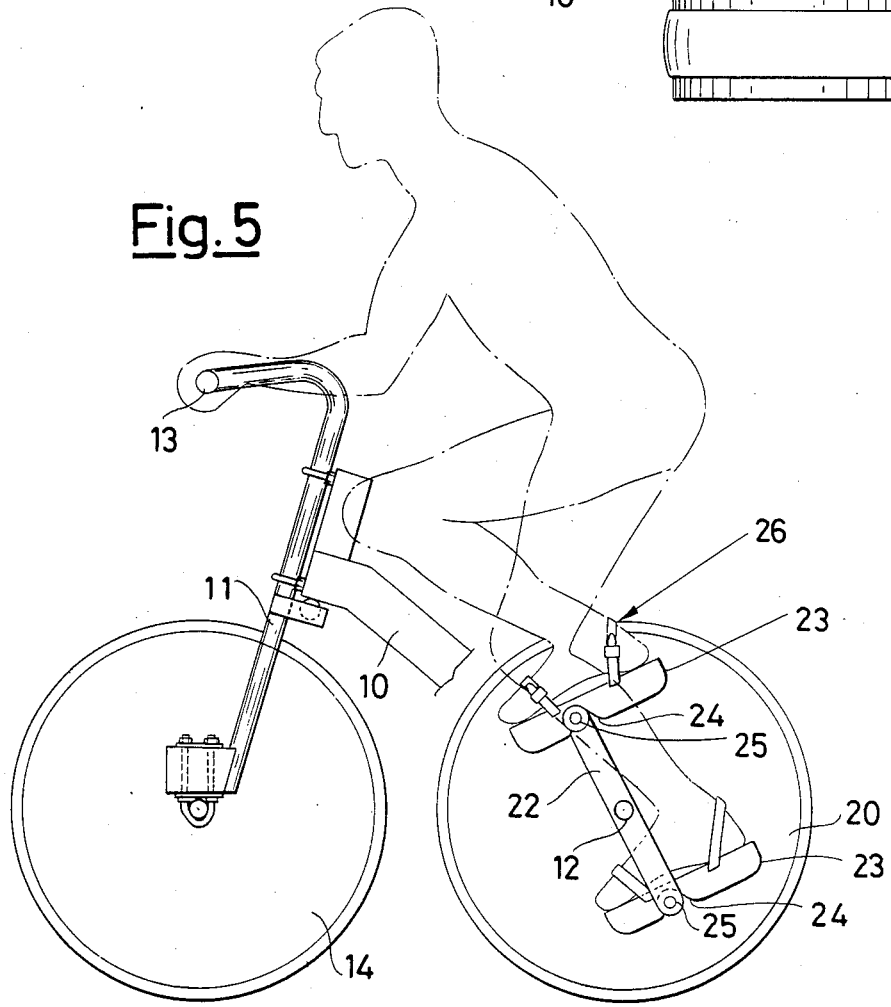
FIG. 5 is a schematic view of the operation of the invention of FIGS. 1, 2, 3 and 4.

As described and as illustrated in FIG. 5, the vehicular device is used in a standing position, the weight of the body being partly borne by the slightly flexed legs and partly by the arms, also flexed.

Steering is used to brake the vehicular device where there is sufficient friction between the said device and the ground, or as a means of changing direction when the device is used on a liquid surface.

The wheels, in addition to their function of propulsion and direction when the device is used on firm surfaces, ensure that it remains afloat when placed in a liquid.

It is to be understood that the constructional details, materials, shape and dimensions of the vehicular device can be modified without departing from the spirit and scope of the present invention.

I claim:

1. A seatless pedal-operated vehicular sports device capable of moving over firm surfaces, soft surfaces and liquid surfaces, comprising a seatless frame, a fork having downwardly extending prongs secured for pivotal movement on a forward portion of the frame, the fork having handlebars at its upper end and a front wheel in the form of a closed hollow buoyant cylinder rotatable between its prongs, the frame at its lower rear end rotatably carrying a pedal crank assembly comprising a pair of pedal cranks disposed between and secured rigidly to two rear wheels in the form of closed hollow buoyant cylinders, the parts being so arranged that the user's weight is borne jointly by said pedal crank assembly and said handlebars, platforms having downwardly opening notches that freely detachably receive said pedal cranks, and means for releasably securing said platforms to the feet of a user.

2. A device as claimed in claim 1, in which said frame is also in the form of a fork having rearwardly extending prongs and the pedal crank assembly is disposed between the ends of the last-mentioned prongs.

3. A device as claimed in claim 2, and U-bolts within which said pedal crank assembly is disposed and by which said pedal crank assembly is rotatably secured to the ends of the last-mentioned prongs.

4. A device as claimed in claim 1, and paddles integral with and disposed on the inner side of each of said rear wheels.

* * * * *